April 5, 1960   A. C. ANDERSON ET AL   2,931,155
MOWER UNIT
Filed Nov. 25, 1958   4 Sheets-Sheet 1
FIG. 1.
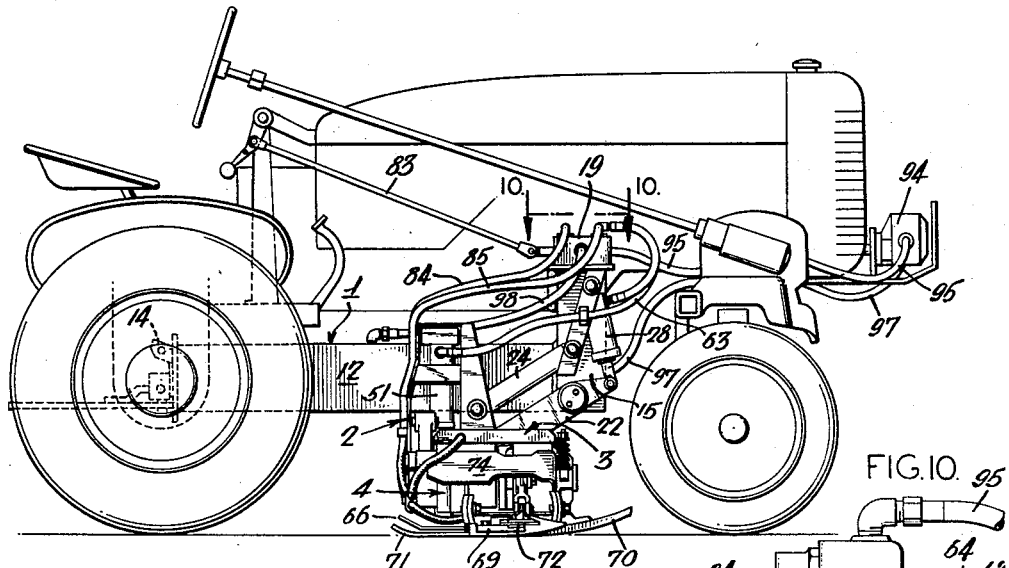
FIG. 3.
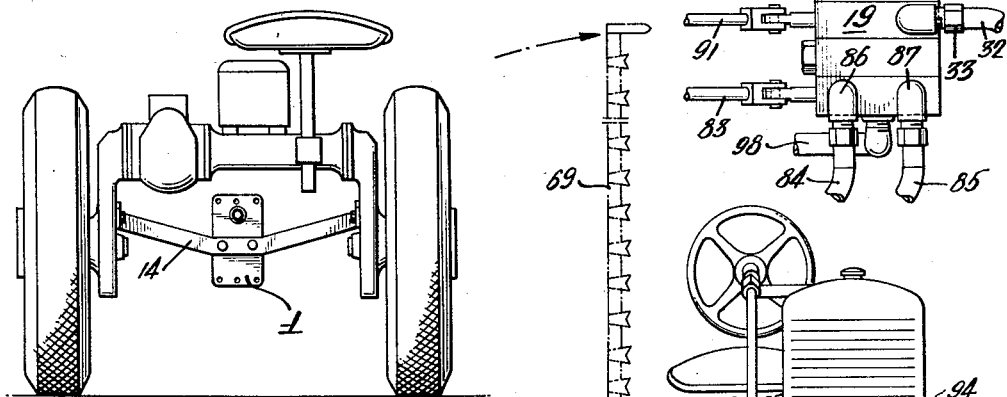
FIG. 10.
FIG. 2.
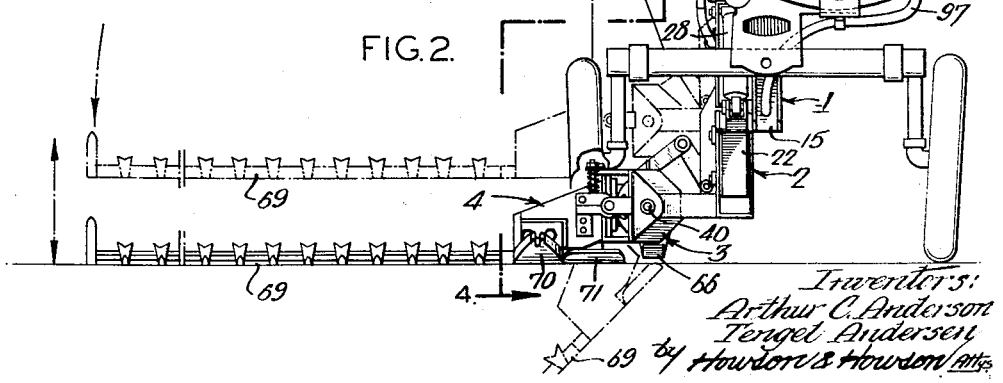
Inventors:
Arthur C. Anderson
Tengel Andersen
by Howson & Howson Attys

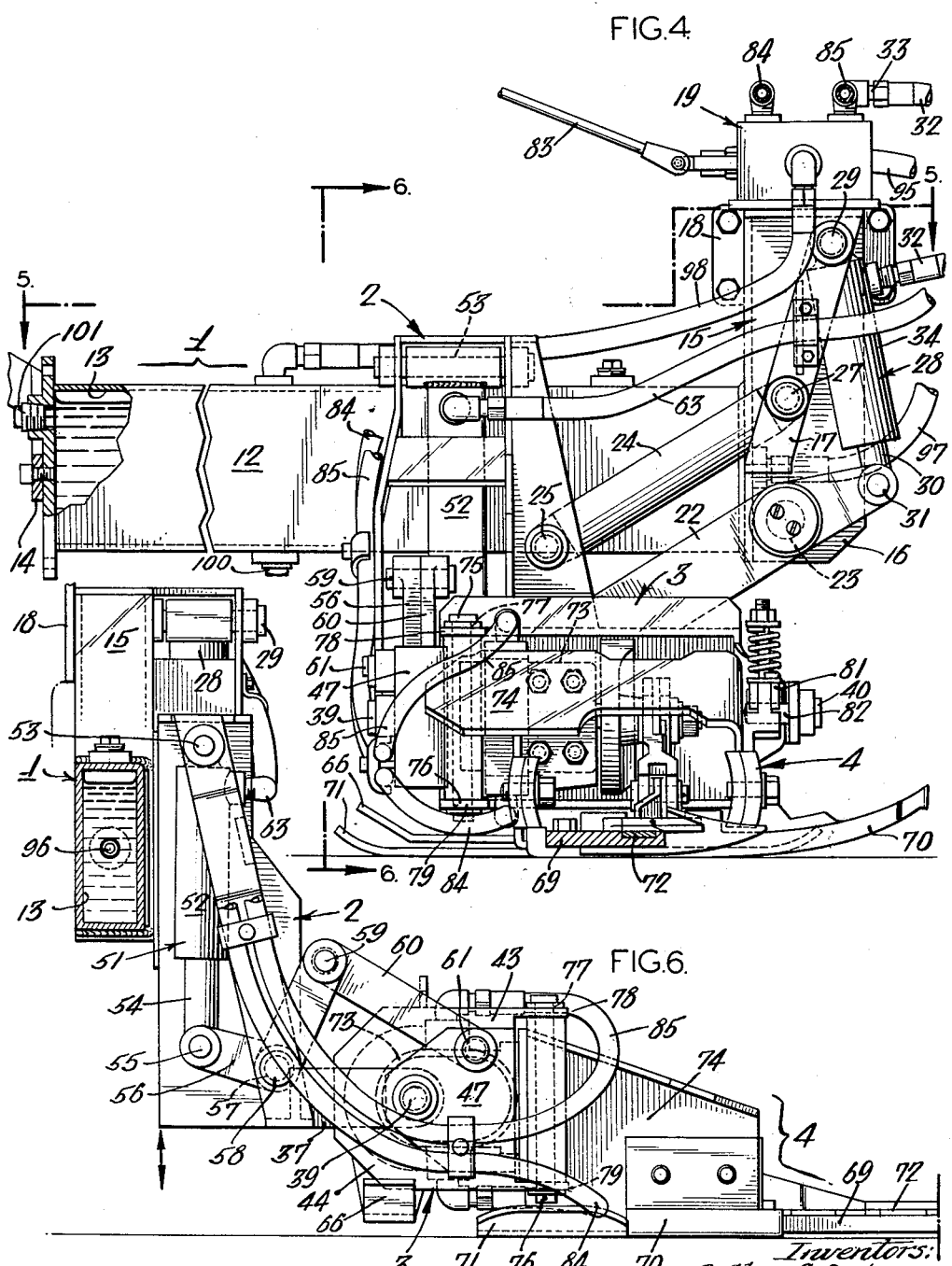

April 5, 1960  A. C. ANDERSON ET AL  2,931,155
MOWER UNIT
Filed Nov. 25, 1958  4 Sheets-Sheet 3
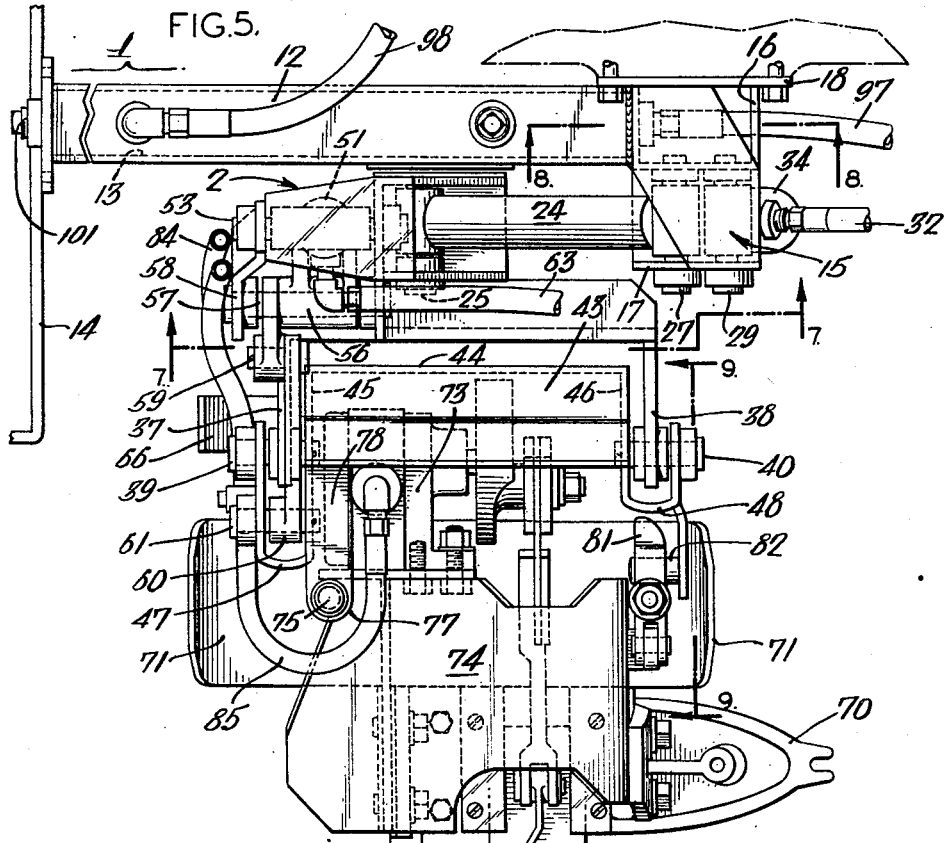
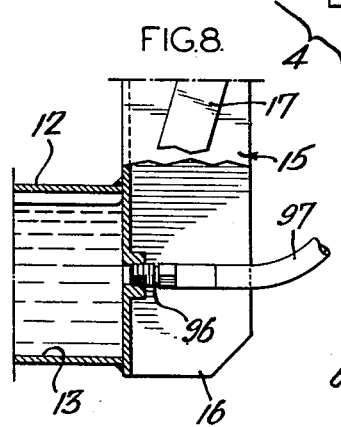
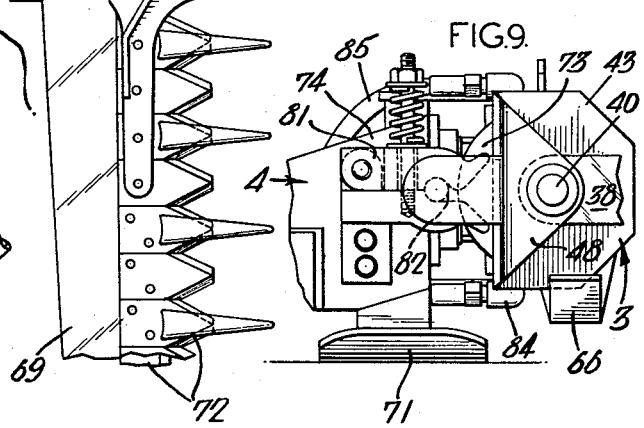
Inventors:
Arthur C. Anderson
Tengel Andersen
by Howson & Howson Atty.

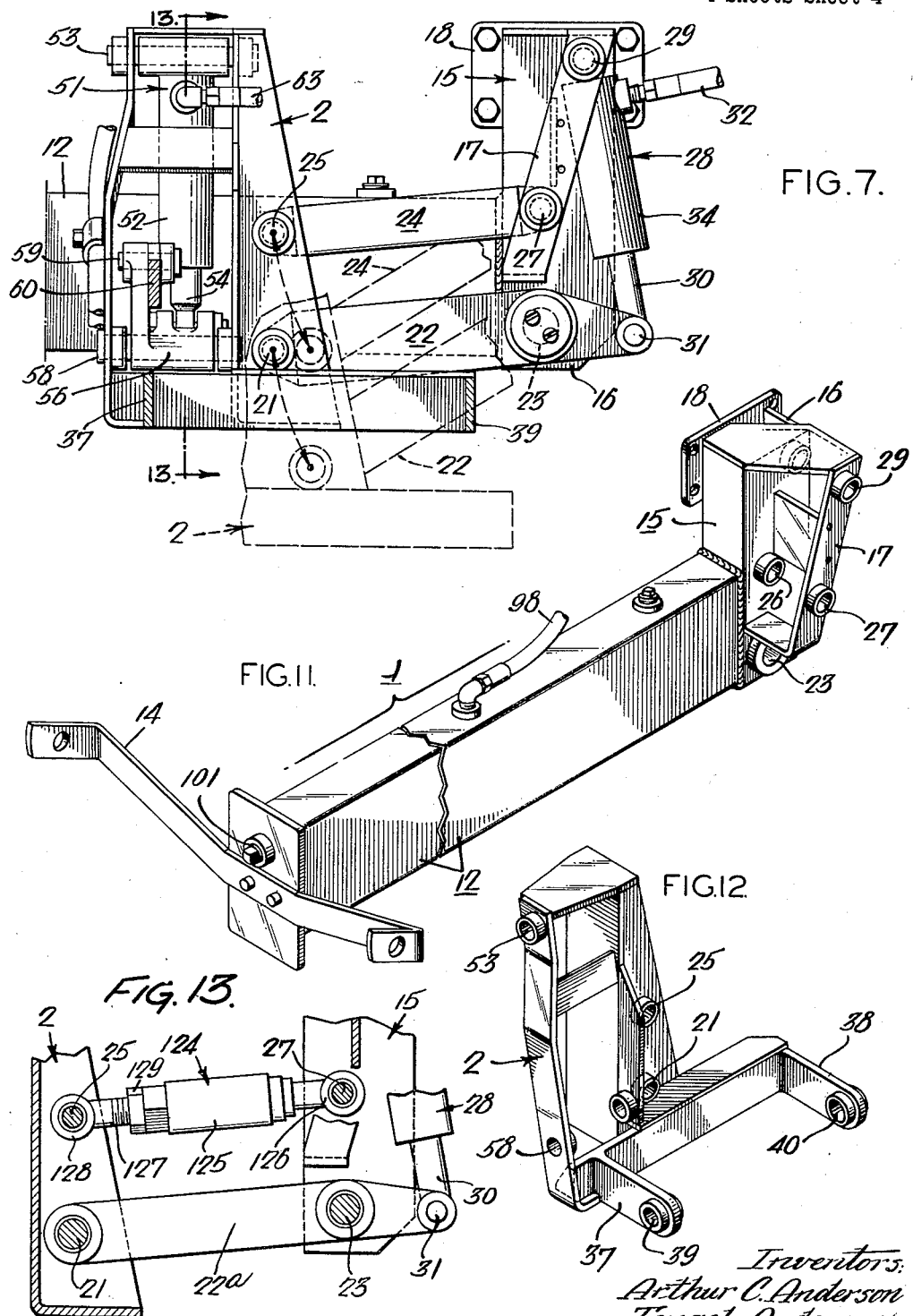

United States Patent Office 2,931,155
Patented Apr. 5, 1960

2,931,155

MOWER UNIT

Arthur C. Anderson, Wildwood Crest, and Tengel Andersen, Wildwood Gardens, N.J., assignors to A. C. Anderson, Inc., Wildwood, N.J., a corporation of New Jersey Application November 25, 1958, Serial No. 776,336

8 Claims. (Cl. 56—25)

This invention relates to mowing machines of the reciprocatory cutter or sickle bar type, and a principal object of the invention is to provide a mower of generally improved mechanical and functional characteristics.

The invention provides a novel suspension for the mower unit in which the cutter bar is dragged over the ground rather than pushed, the suspension enabling the forward movement of the unit to assist in lifting the cutter bar assembly to clear obstructions and the like and to enable the cutter bar to closely follow the contour of the ground.

Another object of the invention is to provide an improved mower unit adapted for attachment to a farm tractor, said unit being self-contained and fully operative independently of the tractor mechanism other than the use of the tractor engine as the prime mover or power source.

A still further object is to provide an improved mower of the stated type wherein means is provided for lifting the cutter bar from the normal operating position, for the purpose of clearing obstructions or for regulating the height of cut above ground level, without material change in the parallel or angular relation of the bar to the horizontal.

More specifically, the invention affords both rearward and upward displacement of the entire cutter bar assembly when it encounters obstructions.

The invention also provides independent adjustment of the cutting height and the angular position of the cutter bar respectively.

The invention resides also in certain other mechanical and structural features and details hereinafter described and illustrated in the attached drawings, wherein:

Fig. 1 is a side elevational view of a tractor mower made in accordance with the invention;

Fig. 2 is a front elevational view of the tractor showing the cutter bar of the mower in several different positions of adjustment;

Fig. 3 is a rear elevational view of the tractor illustrating the manner in which the mower unit is attached to the tractor frame;

Fig. 4 is an enlarged sectional view on the line 4—4, Fig. 2, and illustrates details of the mower unit;

Figs. 5 and 6 are sectional views of the mower unit on the lines 5—5 and 6—6 respectively, Fig. 4;

Figs. 7, 8, and 9 are sectional views on the line 7—7, 8—8 and 9—9 respectively, Fig. 5;

Fig. 10 is a sectional view on the line 10—10, Fig. 1;

Fig. 11 is a view in perspective of the body structure of the mower unit;

Fig. 12 is a view in perspective of the mounting bracket of the mower unit; and

Fig. 13 is a fragmentary view similar to Fig. 7 showing a preferred modified form of linkage.

With reference first to Figs. 1 to 3 of the drawings, which illustrate a preferred organization of my mower unit, it will be noted that the mower mechanism per se takes the form of an independent or self-contained operating unit adapted for attachment as a unit to a suitable engine-driven tractor. The mower unit comprises a body structure 1 rigidly mounted on the tractor, a mounting bracket 2 mounted for upward and rearward pivotal movement in a vertical plane on the body structure 1, a support frame 3 mounted for pivotal movement on the mounting bracket about a horizontal axis, and a cutter bar and blade assembly 4 mounted on the support frame for pivotal movement about a vertical axis, and normally latched in a position extending outwardly from the tractor at one side thereof.

The body structure 1 is best shown in Fig. 11 and comprises a box frame 12 which forms a tank or reservoir 13, and brackets 14 and 15 secured respectively to the opposite ends of the box frame. The bracket 14 spans between the wheel housings of the tractor and mounts the rear end of the body structure 1. The bracket 15 consists of a channel member 16 secured to one end of the box frame, a bridge member 17 which is secured to and extends laterally from the outer web member of the channel 16, and a mounting plate 18 secured to the flanges at the opposite side of the channel 16 which mounts the other end of the body member 1 on the motor of the tractor. When the body member is attached to the tractor as illustrated in Figs. 1, 2, and 3, it occupies a position well below the center of gravity of the tractor and at the mid-section of the tractor and therefore operates to lower the center of gravity to reduce the possibility of tipping.

In accordance with the invention, a novel curb-lift mechanism mounts the mounting bracket 2 for pivotal movement about a horizontal axis and in a vertical plane longitudinal of the tractor. To this end, as shown in Fig. 7, the mounting bracket 2 is pivotally mounted as indicated at 21 on a curb-lift lever 22 which, in turn, is pivoted to the channel 16 as indicated at 23. A parallel link 24 is provided to prevent tilting of the bracket 2, and to this end, is pivoted to the bracket as indicated at 25 and to the body structure 1 between the channel 16 and the bridge 17 as indicated at 26 and 27 respectively (see Fig. 11).

A curb-lift hydraulic ram as indicated generally at 28 is provided to position the bracket 2. As shown in Fig. 7 in the present embodiment of the invention, the ram 28 consists of a cylinder 34 pivoted to the body structure as indicated at 29, and a ram 30 slidable in the cylinder and pivoted to the curb-lift lever 22 as indicated at 31. The ram is actuated by hydraulic fluid admitted to the cylinder 28 by a supply line 32 connected to the valve box 19 as indicated at 33 (see Figs. 4 and 10). Supply of pressure fluid to the line 32 extends the ram 30 to elevate the mounting bracket 2. Connecting the line 32 to exhaust permits the bracket 2 to fall under its weight, and closing the line 32, maintains the bracket 2 at its adjusted position. The ram 28 also permits the bracket 2 to be elevated when the line 32 is closed, for example, when the bracket encounters an obstruction. It is noted that elevation of the bracket 2 is accompanied by rearward movement so that the forward movement of the tractor against the obstruction produces a component of force tending to elevate the bracket to clear the obstruction. After the bracket has cleared the obstruction, the bracket returns automatically to its adjusted elevation.

The support frame 3 is pivotally mounted on the bracket for movement about a horizontal axis. To this end, the bracket 2 is provided with a pair of outwardly extending arms 37 and 38 between which is pivotally mounted the support frame 3 as indicated at 39 and 40 respectively. The support frame comprises a base structure 43 having a convex rear wall 44 which terminates at each end in an end plate 45 and 46 respectively. The outward ends of each of the plates 45 and 46 is turned rearwardly and inwardly to form substantially U-shaped brackets 47 and 48 respectively in which the pivots 39 and 40 are journalled.

The support frame 3 is adapted to be angularly adjusted on the pivots 39 and 40 by a hydraulic ram 51 mounted in the mounting bracket 2. The ram consists of a cylinder 52 pivoted at one end on the mounting bracket 2 as indicated at 53 and slidably mounting a ram 54 at the other end. The ram is pivoted as indicated at 55 to an offset bell crank 56 (see Figs. 5 and 6) mounted on a trunnion 57 journalled in the bracket 2 as indicated at 58. The other end of the bell crank 56 is pivoted as indicated at 59 to a link 60 which is pivoted in the U-shaped bracket 47 as indicated at 61. Hydraulic fluid for actuating the ram 51 is admitted to the cylinder by a supply line 63 connected to the valve box 19 as indicated at 64 (see Fig. 10). The ram 50 is constructed similarly to the ram 28 and operates to angularly position the support frame on the mounting bracket, but affords upward pivotal displacement of the support frame so that the cutter bar may ride over obstructions, and return to its adjusted position. A guard 66 underlies the body portion 43 to prevent damage thereto when it rides over the obstruction.

The cutter bar and blade assembly 4 is mounted on the support frame for pivotal movement about a vertical axis. The assembly 4 comprises a conventional cutter bar 69 secured to shoes 70 and 71. A cutter blade 72 cooperates with the cutter bar 69 in conventional manner and is mounted for longitudinal reciprocation by a hydraulic motor 73 mounted on a housing 74 forming a part of the cutter bar and blade assembly 4. The hydraulic motor 73 is reversible and is supplied through lines 84 and 85 from the valve box 19 through connections indicated at 86 and 87.

The housing 74 is pivotally mounted on a pin 75 journalled as indicated at 76 and 77 in arms 78 and 79 extending from the support frame 3, at the rearward end thereof. A latch 81 on the housing 74 cooperates with a latch pin 82 at the forward end of the support frame 3 to normally retain the cutter bar in the position illustrated in Fig. 5. Should the cutter bar encounter an obstruction which does not raise the cutter bar over it, the latch 81 disengages the pin 82 and permits the cutter bar and blade assembly to swing rearwardly about the pin 75.

The hydraulic circuit for the mower unit is preferably similar to that shown in our U.S. Patent No. 2,828,598 dated April 1, 1958, and reference may be had to that patent for a detailed explanation. Suffice it to say, as shown in Fig. 10, the valve box 19 is provided with a valve operator 91 for controlling the supply to the curb-lift mechanism through the line 32, a valve operator 92 for controlling the hydraulic fluid supply to the angular adjustment mechanism through the lines 63, and an operator 83 for controlling hydraulic fluid through the lines 84 and 85 to and from the motor 73. The valve box 19 is supplied with hydraulic fluid from a pump 94 mounted on the front of the tractor and connected to the box through a line 95 and is connected to an inlet fitting 96 in the tank 13 by a line 97 (see Fig. 8). From the reservoir 13, the hydraulic fluid is returned to the pump 94 through a line 98. A drain is provided at 100, and a filling port is provided at 101.

As pointed out above, the construction of the hydraulic rams 28 and 51 for operating the curb-lift mechanism and angular adjusting mechanism respectively, afford upward displacement of the elements when the fluid supply line thereto is closed. The displacement occurs, for example, when an obstruction is encountered. After the unit has ridden over the obstruction, the weight of the unit returns the ram into position, the position to which it was originally adjusted. Thus, the present invention enables the unit to ride over obstructions and automatically return to its adjusted position without attention from the operator. The valve operator 91 has a detent position in which the ram 28 permits the bracket 2 to freely follow the ground. When the valve is in this position, the full advantages of the novel curb-lift mechanism are realized. When the mounting bracket 2 is supported by the slide shoes, the curb-lift lever, in effect, drags the cutter bar assembly over the surface of the ground. When dragged in this manner, the assembly may follow the contour of the ground much more readily than when it is pushed. Thus, when the assembly engages an obstruction, the forward movement of the tractor and the rearward declination of the curb-lift lever assist in lifting the cutter bar assembly over the obstruction. When the obstruction is passed, the assembly is free to fall back into contact with the ground surface.

In the conventional mower unit, the angle of attack of the cutter bar, i.e., the angle of the forwardly projecting stone guards with the horizontal, is adjusted by regulating the cutter bar on the mounting bracket. This is often difficult and time-consuming. The present invention enables a simple adjustment of the angle of attack to accommodate different conditions in the grass or ground being mowed. To this end, an adjustable link 124 is substituted for the fixed link 24 of the previously described embodiment. As shown in Fig. 13, the adjustable parallel link 124 comprises an internally threaded sleeve 125 having an eye 126 at one end and threadably engaged with the threaded shank 127 of an eye 128 at the other end. A lock nut is provided at 129. Thus, by adjusting the link 124, the angle of the mounting bracket 2 is regulated to provide the desired angle of attack of the stone guards and slide shoes. The normal range of adjustment does not substantially affect the parallel arrangement of the link 124 and the curb-lift lever.

While particular embodiments of the present invention have been herein illustrated and described, it is not intended to limit the invention to such disclosure, but changes and modifications may be made therein and thereto within the scope of the following claims.

We claim:

1. A mower unit comprising a body structure adapted to be rigidly mounted on a tractor, a mounting bracket pivotally mounted on said body structure, and a cutter bar and blade assembly, means mounting said assembly on said mounting bracket to normally extend outwardly therefrom, the improvement which consists of a curb-lift lever pivoted to said body structure on a horizontal axis disposed transversely of the tractor and pivoted to said mounting bracket on a horizontal transverse axis parallel to said first-mentioned pivotal axis, and a connecting link parallel to said lever and pivoted respectively to said body structure and said mounting bracket on axes parallel to said first-mentioned transverse axes, whereby said mounting bracket is displaced vertically without tilting upon pivotal displacement of said lever and link.

2. A unit according to claim 1 wherein said lever and link each decline rearwardly from said body structure whereby upon elevation of said mounting bracket, the latter is displaced rearwardly by said lever and link.

3. A unit according to claim 1 including a hydraulic cylinder and plunger assembly connected to said lever operable upon application of hydraulic fluid pressure to said cylinder to elevate said lever and thereby said mounting bracket.

4. Apparatus according to claim 3 wherein said lever is pivoted centrally to said body structure, pivoted at one end to said mounting bracket and pivoted at the other end to said plunger, said cylinder being pivoted to said body structure whereby upon extension of said plunger said mounting bracket is elevated.

5. A mower unit comprising a body structure adapted to be rigidly mounted on a tractor, a mounting bracket pivotally mounted on said body structure below and to the rear thereof, and a cutter bar and blade assembly, and means mounting said assembly on said mounting bracket to normally extend outwardly therefrom, the improvement which consists of a curb-lift mechanism including a curb-lift lever pivoted to said body structure on a horizontal axis disposed transversely of the tractor declining rearwardly from said body structure and pivoted to said mounting bracket on a horizontal transverse axis parallel to said first-mentioned pivotal axis whereby upon elevation of said mounting bracket, the latter is displaced rearwardly by said lever.

6. A unit according to claim 5 including a hydraulic cylinder and plunger assembly connected to said curb-lift lever operable upon application of hydraulic fluid pressure to said cylinder to elevate said lever and thereby said mounting bracket.

7. A mower unit according to claim 5 including a link mounted between said mounting bracket and said body structure substantially parallel to said curb-lift lever to positively determine the angle of attack on said mounting bracket and said cutter bar and blade assembly.

8. A mower unit according to claim 7 including means to adjust the length of said parallel link to selectively regulate the angle of attack of said cutter bar and blade assembly in accordance with the conditions of the grass and ground being mowed.

References Cited in the file of this patent

UNITED STATES PATENTS

| | | |
|---|---|---|
| 2,767,539 | Huddle | Oct. 23, 1956 |
| 2,828,598 | Anderson et al. | Apr. 1, 1958 |